United States Patent [19]

Mochida et al.

[11] 4,345,863
[45] Aug. 24, 1982

[54] NUT CONTROL DEVICE

[75] Inventors: Haruo Mochida, Yokohama; Tetsuo Kobayashi, Ikeda, both of Japan

[73] Assignees: Nissan Motor Company, Limited; Nippon Cable System, Inc., both of Japan

[21] Appl. No.: 150,623

[22] Filed: May 16, 1980

[30] Foreign Application Priority Data

Jul. 13, 1979 [JP] Japan .................................. 54-89130

[51] Int. Cl.³ ............................................ F16B 37/12
[52] U.S. Cl. ................................... 411/252; 411/438
[58] Field of Search ............... 411/250, 251, 252, 432, 411/436, 438

[56] References Cited
U.S. PATENT DOCUMENTS 1,630,958 5/1927 Mauch .................................. 411/252

FOREIGN PATENT DOCUMENTS

| 411183 | 3/1925 | Fed. Rep. of Germany ...... 411/438 |
| 164706 | 12/1949 | Fed. Rep. of Germany ...... 411/251 |
| 675758 | 2/1930 | France . |
| 654441 | 6/1951 | United Kingdom ............... 411/251 |

*Primary Examiner*—Thomas J. Holko
*Attorney, Agent, or Firm*—Lane, Aitken, Kice & Kananen

[57] ABSTRACT

A control device for preventing a nut from loosening, comprises a first member having an external thread portion, a second member having an internal thread portion screwed with the external thread portion and an opening, a locking coil which is wound around the external thread portion of the first member and has at its both ends bent portions to be selectively engaged with the opposite sides of the opening of the second member, and a third member which is rotatably fitted in the second member and engaged or disengaged with the bent portions of the locking coil.

2 Claims, 2 Drawing Figures

NUT CONTROL DEVICE

BACKGROUND OF THE INVENTION

This invention relates to a control device which prevents a nut from loosening.

In a conventional manner, a double nut is used for preventing a nut from loosening. After two nuts are set at a predetermined position by a fitting tool, one is fixed while the other is further clamped so as to prevent the nuts from loosening. Such an operation is cumbersome.

SUMMARY OF THE INVENTION

The object of this invention is to overcome the above said inconvenience in a conventional manner by providing a control device which can prevent a nut from loosening with easy operation.

A device according to this invention comprises a locking coil wound around the internal thread portion of a first member, a second member screwed with the first member, and a third member rotatably fitted onto the second member and engaged with the locking coil.

DESCRIPTION OF THE EMBODIMENTS

Figure 1:
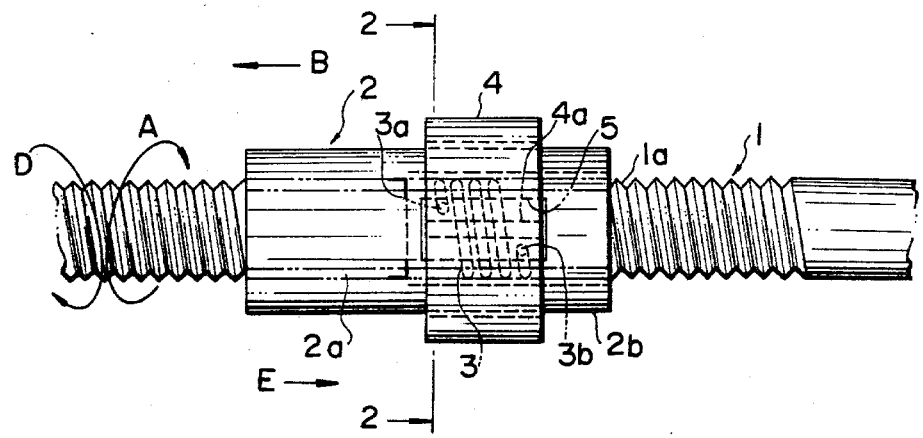
FIG. 1 is a front view showing a control device for a nut according to an embodiment of the present invention.
Figure 2:
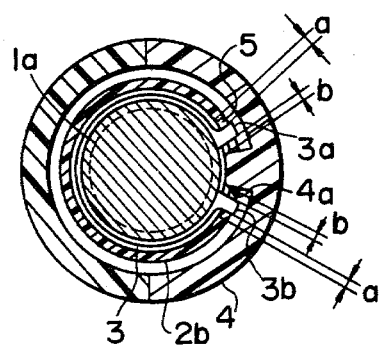
FIG. 2 is a sectional view taken along the line 2—2 in FIG. 1.

A first member 1 has an external thread portion 1a. A second member 2 is a nut which has an internal thread portion 2a screwed with the external thread portion 1a, and a collar portion 2b having a bigger inner diameter than the outer diameter of the external thread portion 1a. A locking coil 3 has at its ends bent portions 3a, 3b which may engage with both sides of a long rectangular opening 5 of the nut 2, respectively. The locking coil 3 is wound around the external thread portion 1a at the same pitch. The inner diameter and thickness of the locking coil 3 are so determined that a predetermined tension and clamping force of the locking coil 3 can be exerted against the external thread portion 1a. A third member 4 is a ring. The ring 4 has a bigger inner diameter than an outer diameter of the nut 2. The ring 4 has a projection 4a protruding inwardly which is to be selectively engaged with the long opening 5 and is placed between the bent portions 3a and 3b. The projection 4a is engaged with the bent portions 3a, 3b when the ring 4 is rotated. A certain clearance a is set between the both sides of the long opening 5 of the nut 2 and the bent portions 3a, 3b of the locking coil 3 so that they may not contact each other. Also a certain clearance b is set between the projection 4a of the ring 4 and the bent portions 3a, 3b of the locking coil 3 so that they may not contact each other.

In the above structure, when the ring 4 is rotated in the direction A in FIG. 1 by a hand or hands without any tools, the bent portion 3a of the locking coil 3 comes into engagement with the projection 4a of the ring 4. The locking coil 3 is extended and loosened from the external thread portion 1a so that the ring 4 can be easily rotated and moved in the direction B in FIG. 1 together with the nut 2. After the nut 2 is rotated and moved to a predetermined position, the hands are detached. At this time, because the locking coil 3 is not enlarged, the locking coil 3 binds the external thread portion 1a. Consequently, the nut 2 does not rotate, that is, the nut 2 is prevented from loosening. In case of its reversal, the ring 4 is rotated in the direction D by hands in such a way that the projection 4a of the ring 4 comes into engagement with the bent portion 3b of the locking coil 3. As above mentioned, the nut 2 is rotated and moved in the direction E together with the ring 4. After the nut 2 is moved to a predetermined position, the hands are detached from the ring 4, so that the nut 2 does not rotate any more. Therefore the nut 2 can be prevented from loosening.

As has been explained, according to this invention, the nut can be easily moved and prevented from loosening, merely by rotating and moving the third member together with the second member to a predetermined position.

What is claimed is:

1. A control device for preventing a nut from loosening, comprising:
   a first member having an external thread portion;
   a second member having an internal thread portion screwed with the external thread portion and an opening;
   a locking coil which is wound around the external thread portion of the first member and has at its both ends bent portions to be selectively engaged with the opposite sides of the opening of the second member; and
   a third member which is loosely rotatably fitted in the opening of the second member and has a projection which is engaged or disengaged with the bent portions of the locking coil,
   wherein the opening of the second member is a rectangular aperture formed in its longitudinal direction, and the bent portions of the locking coils and the projection of the third member are placed within the rectangular aperture thereof in such a manner that a certain clearance can be set between the side walls of the rectangular aperture of the second member and the bent portions of the locking coil, the projection of the third member being between the bent portions of the locking coil.

2. A control device as claimed in claim 1 wherein the second member is a nut having a collar portion with its inner diameter bigger than the outer diameter of the external thread portion of the first member.

* * * * *